May 19, 1953  N. A. MERRITT  2,639,038
MEAT KNIFE HOLDER
Filed Jan. 10, 1952  2 Sheets-Sheet 1

Norman A. Merritt
INVENTOR.

BY *Clarence A. O'Brien*
*and Harvey B. Jacobson*
Attorneys

May 19, 1953    N. A. MERRITT    2,639,038
MEAT KNIFE HOLDER
Filed Jan. 10, 1952    2 Sheets—Sheet 2
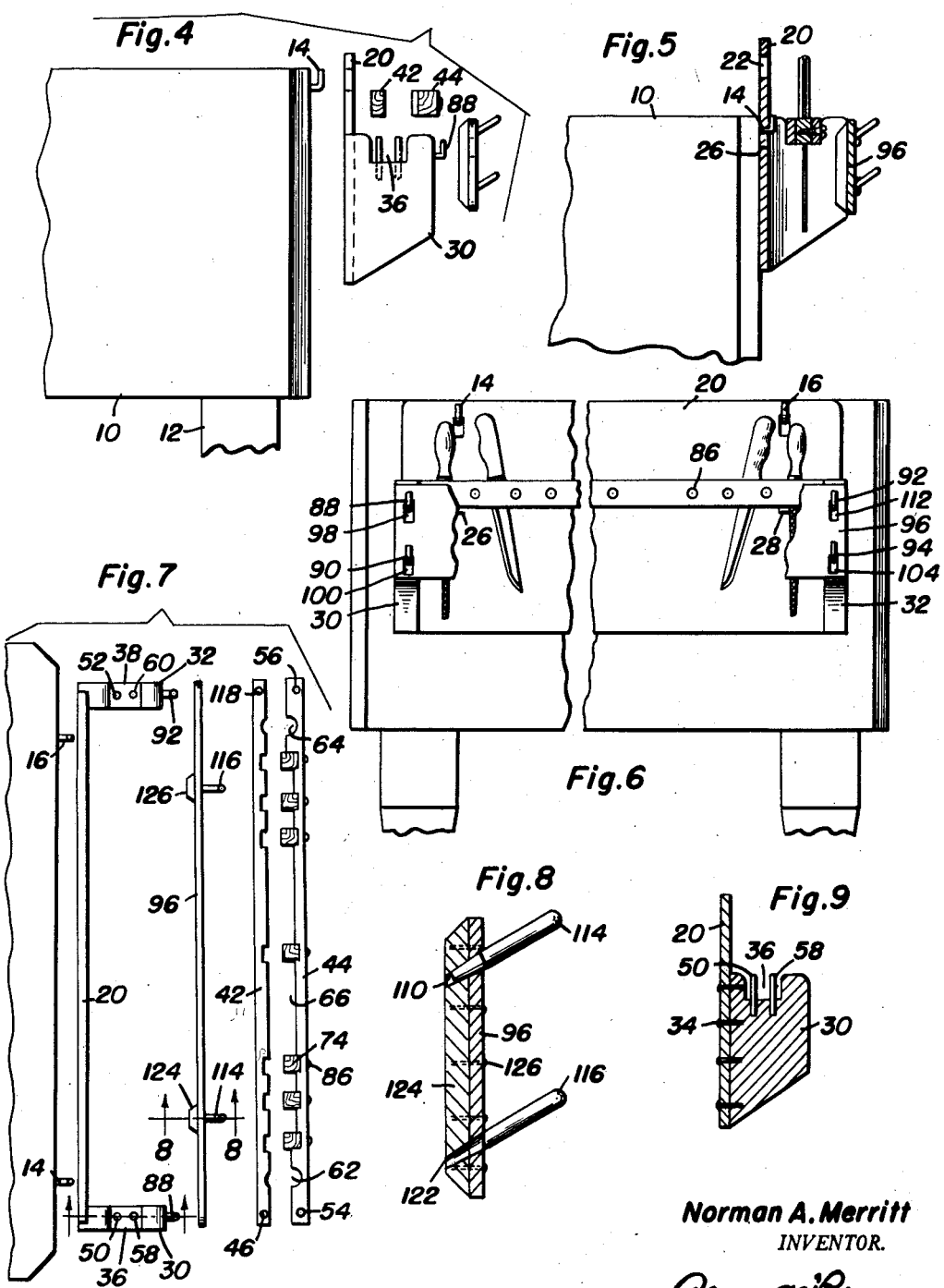
Norman A. Merritt
INVENTOR.

Patented May 19, 1953

2,639,038

UNITED STATES PATENT OFFICE 2,639,038

MEAT KNIFE HOLDER

Norman A. Merritt, Wilmington, N. C.

Application January 10, 1952, Serial No. 265,884

4 Claims. (Cl. 211—60)

This invention relates to a meat knife holder, and particularly to a demountable holder for mounting on the side of a meatcutter's block for holding the knives and other equipment of a meatcutter.

In meat cutting operations, it is customary to use a meat block and to dispose a rack alongside one side of the block to hold the knives and tools that the meatcutter uses during the operation. Heretofore, these racks have been securely mounted on the side of the block and it has been exceedingly difficult to clean and keep them in a sanitary condition.

The present invention provides a meat knife holder which is detachably mounted on the side of a meat block and which holder can be completely demounted so that each and every part of it can be thoroughly cleaned, brushed and sanitized.

The meat knife holder according to the invention includes a skirt for mounting against the meat block and brackets for holding the knife rack and other portions of the tool holder.

It is accordingly an object of this invention to provide an improved meat knife holder.

Another object of the invention is to provide a demountable meat knife holder.

It is still a further object of the invention to provide a meat knife holder all portions of which may be conveniently cleaned and made sanitary.

It is a further object of the invention to provide a knife rack the portions of which may be renewed as they are worn.

Other objects and advantages of the invention will be apparent from the following detailed description taken in conjunction with the accompanying drawing, in which:

Figure 4 is an exploded end view of the holder;

Figure 5 is a cross section showing the holder in elevated position and taken substantially on the plane indicated by the line 5—5 of Figure 2;

Figure 6 is an elevation with parts broken away and showing the holder in a lower position;

Figure 7 is an exploded plan view of the holder;

Figure 8 is a cross section through the guard and saw support and taken substantially on the plane indicated by the line 8—8 of Figure 7; and Figure 9 is a cross section of the rack holder taken substantially on the plane indicated by the line 9—9 of Figure 7.

In the exemplary embodiment of the invention, a meat block 10 which is supported at a convenient height by any suitable means such as legs 12 is provided with L-shaped screws 14 and 16.

Figure 1:
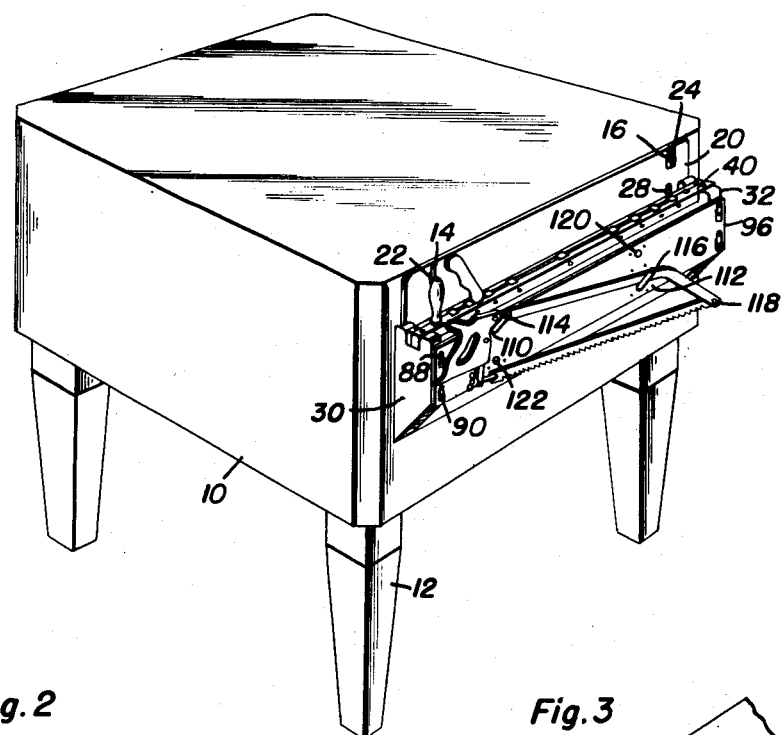
Figure 1 is a perspective view of a meat block with the meat knife holder attached.
Figure 2:
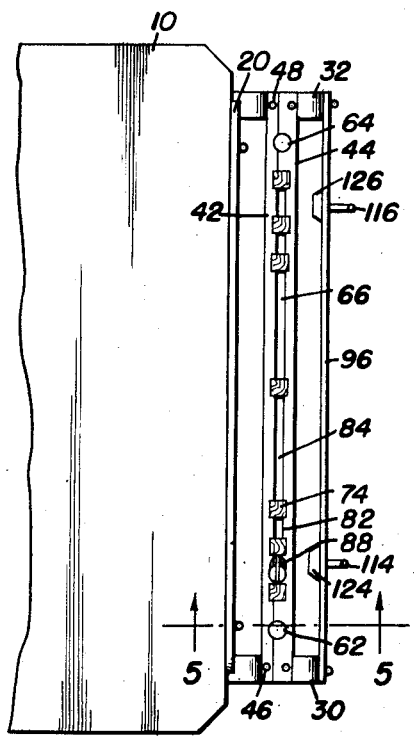
Figure 2 is a top plan view of the meat knife holder in position on a meat block.
Figure 3:
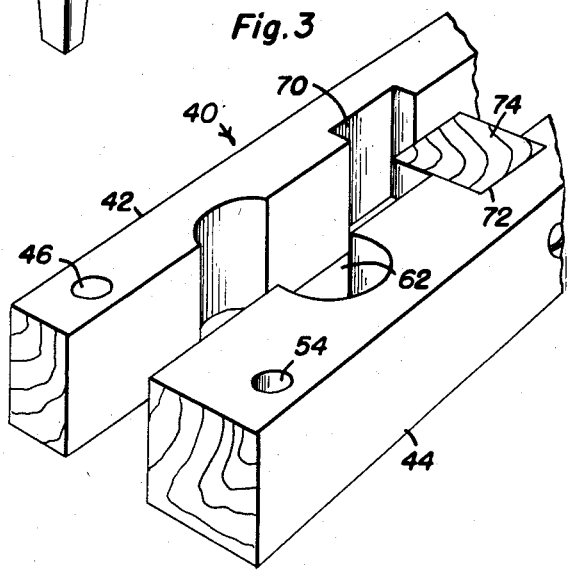
Figure 3 is an enlarged perspective view of a portion of the knife rack.

The meat knife holder includes a back skirt board 20 having upper apertures 22 and 24 for engaging the screws 14 and 16 to mount the skirt board in a low position on the side of the meat block 10. The skirt 20 is also provided with lower apertures 26 and 28 so that the apertures 22 and 24 or 26 and 28 may be selectively engaged with the screw hooks 14 and 16 so that the skirt 20 may either be mounted below the top of the block 10 or may extend above the surface of the block 10, as shown in Figures 2 and 5.

Rack mounting brackets 30 and 32 are fixed on the skirt 20 by means of suitable fasteners such as the nails 34. Each of the brackets 30 and 32 is provided with a vertical notch 36 or 38 for detachably retaining the knife rack indicated generally at 40. The rack 40 includes a back bar 42 and a front bar 44 which are arranged in edge-to-edge relation. The bar 42 is provided with end apertures 46 and 48 which engage pins 50 and 52 in the notches 36 and 38, respectively. The bar 44 is provided with apertures 54 and 56 for engagement with pins 58 and 60 in the notches 36 and 38 respectively. When the bars 40 and 42 respectively engage the pins, the bars are rigidly mounted in the notches 36 and 38 so that they act substantially as a unitary bar. Split apertures 62 and 64 are provided at each end of the rack 40 so that a butcher's steel or other similar round tool may be maintained and kept in safety therein. An intermediate portion of the meeting face of the bars 42 and 44 is cut away to provide a longitudinal slot 66. The bar 42 is provided with a plurality of recesses 70, and bar 44 is provided with a plurality of matching recesses 72. Blocks 74 are secured in the recesses on one of the bars, such as 44, and extend across the slot 66 into the recess 70 in the other bar, such as 42, to provide dividers which divide the slot 66 up into a plurality of apertures such as 80, 82, 84, and so on. Preferably, the aperture arrangement starts at the end of the bar and continues to the middle thereof from each end so that the bar may be utilized by either a right- or left-handed butcher without any change in the construction or arrangement of the bar. The blocks 74 are preferably made of hardwood or other tough material which will be substantially non-injurious to the edges of the knives or other tools placed in the rack. Since these blocks will be subject to chipping and wear during the utilization of the block, it is desirable that they be removable so that new blocks may be inserted to substantially renew the rack whenever necessary. For this purpose, removable fasteners such as screws 86 have been provided in the bar 44, L-shaped screws 88 and 90 are provided on the front face of the bracket 30, and similar screws 92 and 94 are provided on the bracket 32, and a guard board 96 is provided with apertures 98 and 100 to engage the screws 88 and 90, and apertures 102 and 104 to engage the screws 92 and 94 so that the guard board 96 is detachably mounted on the face of the brackets and substantially covers the blades of the tools when they are in the rack.

To provide a convenient location for hanging certain tools such as a meat saw, apertures 110 and 112 are provided in spaced apart position on the guard board 96 and preferably one of the apertures, such as 112, is lower than the aperture 110 and pins 114 and 116 are inserted so that they are substantially on a slantwise to readily receive a tool such as the saw 118. Since the rack is otherwise adapted to either a left- or right-handed operator, it is preferable to provide an additional aperture 120 and 122 so that the pins 114 and 116 may be shifted so that the pins will be in the proper position to receive the saw when deposited by means of a left-handed operator.

In order that the guard board may be relatively thin and light, it is desirable to provide reinforcing members 124 and 126 so that the various holes 110 and 122, etc. will extend through the board 96 and into the reinforcing members so that the pins may be conveniently maintained in place and will not necessarily wear out the hole or crack the board 96. Preferably, the reinforcing members 124 and 126 are rigidly fixed to the board 96 by means of suitable fasteners, such as the nails 126.

In the operation of the construction according to the invention for utilizing the knives while cutting large pieces such as quarters of beef and such like, the skirt board will be attached by means of the upper apertures 22 and 24 so that the top edge of the skirt 20 will be below the surface of the meat block 10 and the carcass being operated on may be readily turned in any direction without touching the knife holder or the handles of the knives contained therein. However, when performing such operations as trimming, slicing and so on, the skirt will be mounted by means of the apertures 26 and 28 so that the skirt board will extend above the top of the block, so that trimmings may be tossed to the side of the block without falling onto the floor or contaminating the handles of the knives or tools contained in the rack.

Instead of utilizing the rack either for left- or right-handed persons, a single butcher may put two sets of tools in the rack and maintain them separate therein. For example, when he comes to work in the morning he may have two sets of tools completely sharpened. By placing one set of tools in one end of the rack and the other set of tools in the other end of the rack, he may use one set until it becomes dulled, at which time he may transfer the tools and use the sharpened tools until they become dull so that he can sharpen all of the tools simultaneously.

It will be readily apparent that the invention provides a meat knife holder which can be readily demounted from the meat block so that the sides of the meat block may be thoroughly cleaned or scrubbed while the knife holder itself may be dismounted and placed into water or other cleansing fluids or placed in disinfectants to be completely sanitized. All of the component parts are so open and arranged that a brush or other cleansing tool may be applied to any portion of the holder without unnecessary difficulty on the part of the operator.

For purpose of exemplification, a particular embodiment of the invention has been shown and described according to the best present understanding thereof. However, it will be apparent to those skilled in the art that many changes and modifications can be made therein without departing from the true spirit of the invention.

Having described the invention, what is claimed as new is:

1. A meat knife holder to be detachably mounted on a meat block, comprising a back skirt board, a pair of brackets secured in spaced apart relation on said skirt, a knife rack detachably supported on said brackets, a guard board detachably mounted on said brackets.

2. A meat knife holder to be detachably mounted on a meat block, comprising a back skirt board, a pair of brackets secured in spaced apart relation on said skirt, a knife rack detachably supported on said brackets, said knife rack including a pair of longitudinally extending bars, said bars having apertures in the ends thereof, pins secured in said brackets, said apertures engaging said pins to detachably secure said bars in edge-to-edge relation, portions of said abutting edges being cut away providing knife receiving apertures.

3. A meat knife holder comprising a skirt board, said board having a plurality of apertures for selectively engaging mounted hooks to determine the elevation of said skirt, a pair of spaced apart brackets secured on said skirt, rack-receiving notches in said brackets, upstanding spaced apart pins in said notches, a rack including a pair of bars, each of said bars having an aperture at each end engaging said pins removably mounting said bars in edge-to-edge relation, knife receiving apertures in said rack.

4. A meat knife holder comprising a back skirt board, a pair of knife rack supporting brackets secured on said skirt, each of said brackets having a vertical notch therein, a pair of upstanding pins mounted in each of said notches, a pair of bars engaging said pins, apertures at the meeting faces of said bars being cut away providing a longitudinal slot between said bars, dividing blocks secured to one of said bars and extending across said slot, said blocks dividing said slot into a plurality of tool receiving apertures.

NORMAN A. MERRITT.

References Cited in the file of this patent

UNITED STATES PATENTS

| Number | Name | Date |
|---|---|---|
| 769,024 | Ryan | Aug. 30, 1904 |
| 1,294,916 | Knight | Feb. 18, 1919 |
| 1,748,259 | Van Meter et al. | Feb. 25, 1930 |
| 1,894,258 | Eastlack | Jan. 17, 1933 |
| 2,566,082 | Droshine | Aug. 28, 1951 |
| 2,571,972 | Wagner | Oct. 16, 1951 |